May 12, 1931. W. W. EVERTS 1,804,827
SADIRON
Filed Aug. 5. 1929
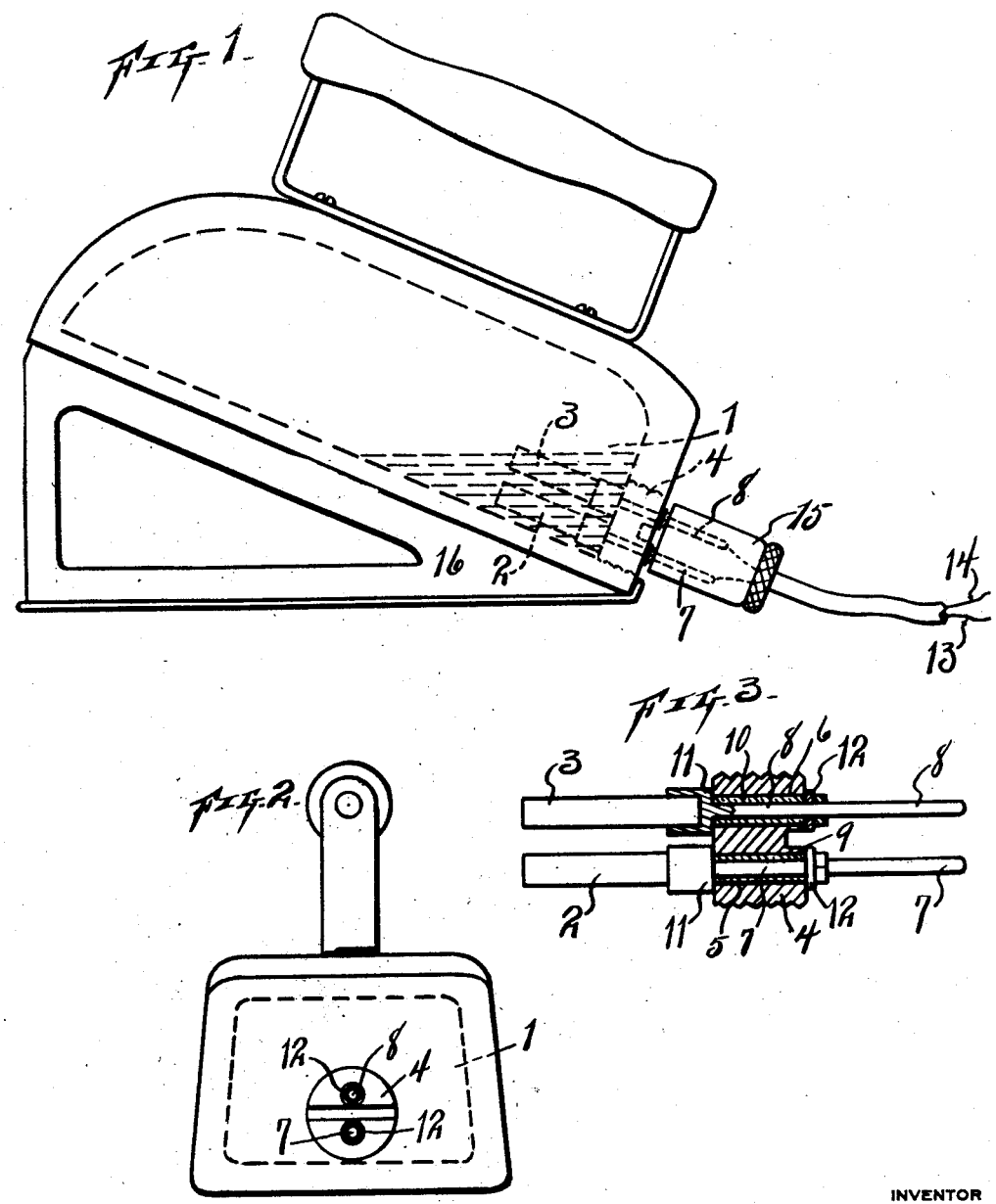

Patented May 12, 1931

1,804,827

UNITED STATES PATENT OFFICE

WALTER W. EVERTS, OF FORT WORTH, TEXAS, ASSIGNOR TO SID POST, OF FORT WORTH, TEXAS

SADIRON

Application filed August 5, 1929. Serial No. 383,680.

My invention relates to electrically heated sadirons, and more particularly to a transmitting or conducting element which is electrically heated; and the object is to provide a sadiron which is provided with means for maintaining heat which is approximately constant and uniform in the iron and to provide devices or elements which operate as an automatic thermostat within the casing of the iron. The advantage of such invention is that the amount of heat created or generated is automatically controlled. Other objects and advantages will be fully explained in the following description and the invention will be more particularly pointed out in the claims.

Reference is had to the accompanying drawings which form a part of this application.

Fig. 1 is a side elevation of the sadiron shown in position for preliminary heating.

Fig. 2 is an end elevation of the sadiron.

Fig. 3 is a longitudinal section of the means for mounting the heating elements.

Similar characters of reference are used to indicate the same parts throughout the several views.

The improved sadiron has a casing 1 which has the shape generally of an ordinary sadiron, but it is deeper from top to bottom. The casing is hollow and the space within the casing is sufficiently large to contain steam which will be generated from water or other suitable material placed therein. Carbon elements 2 and 3 are mounted in the casing and spaced apart, one above the other. A metallic plug 4 is screwed into the casing 1 and provided with two openings 5 and 6. The carbon elements 2 and 3 are carried by two metallic terminals 7 and 8 which are insulated from the plug 4 by porcelain tubes 9 and 10 which are mounted in the openings 5 and 6. The terminals 7 and 8 have sockets on their inner ends for carrying the carbon elements 2 and 3. The terminals 7 and 8 are insulated from the plug 4 by washers 11 and 12 and the washers also prevent leaking. Current wires 13 and 14 are connected to the terminals 7 and 8. A socket plug 15 is provided and is detachable and operates as other plugs.

A holder is provided for the sadiron for holding the sadiron in position for the initial heating. Sufficient water or other liquid is placed in the casing and sealed therein by the devices above set forth. The sadiron is mounted on the holder 16 for causing the liquid to cover the carbon elements 2 and 3. Only sufficient water is sealed in the casing for generating sufficient steam to form a conductor between the carbon elements 2 and 3 so that current will pass from one to the other. After initial heating, the sadiron will be operated in the normal manner approximately or generally in a horizontal position. The water will not cover the carbon elements, but the steam will envelop these elements and the movement of the sadiron will be sufficient to splash the water on the carbon elements. The heating of the steam and the water will continue until the steam becomes superheated or approximately superheated and then the steam ceases to be a conductor of electricity. There will be sufficient heat in the casing to go on with the ironing without generating any more steam for some time and as soon as the heat is reduced sufficiently for the steam to come back to normal steam, the generation of steam will commence again. Such operations will go on indefinitely to become a conductor of electricity the generation of steam by heat will commence again. The steam will become rarefied and cease to be a conductor of electricity and the rarefication of the steam comes gradually and so regulates the degree of heat and maintains the required heat for the sadiron which will never become too hot for ironing purposes and will not burn or scorch the clothing and eliminates all danger of setting a house on fire. The approximate degree of heat is thus automatically controlled.

It is apparent that other material than carbon elements may be used. Other changes may be made without departing from the invention.

What I claim is:—

1. A sadiron comprising a casing having a relatively large interior chamber for containing water and steam, means for sealing said chamber consisting of a plug screwed into said casing and perforated for receiving electric terminals, terminals and porcelain tubes surrounding portions of said terminals, washers sealing and insulating said plug about said terminals, and conductors carried by said terminals.

2. A sadiron having means for automatically maintaining heat to the approximate degree required for ironing purposes consisting of a chamber having a relatively large interior capacity for containing steam and water, means for sealing said chamber, electric terminals projected through said sealing means, and conductors carried by said terminals, one above the other and spaced therefrom, and adapted to project into the space within said chamber to come in contact with water and steam therein.

In testimony whereof, I set my hand, this 15th day of April, 1929.

WALTER W. EVERTS.